(12) United States Patent
Murray

(10) Patent No.: US 7,611,102 B2
(45) Date of Patent: Nov. 3, 2009

(54) HOLDER WITH INTEGRAL GRIPPER FOR TRANSPORTING A FLEXIBLE POUCH DURING MANUFACTURING

(75) Inventor: R. C. Murray, Lakewood, FL (US)

(73) Assignee: Pouch Pac Innovations, LLC, Sarasota, FL (US)

( * ) Notice: Subject to any disclaimer, the term of this patent is extended or adjusted under 35 U.S.C. 154(b) by 1 day.

(21) Appl. No.: 11/736,224

(22) Filed: Apr. 17, 2007

(65) Prior Publication Data

US 2007/0241151 A1 Oct. 18, 2007

Related U.S. Application Data

(60) Provisional application No. 60/792,407, filed on Apr. 17, 2006.

(51) Int. Cl.
B65B 67/04 (2006.01)
B65B 43/28 (2006.01)
(52) U.S. Cl. .................. 248/101; 248/146; 141/391; 383/35; 53/384.1; 198/803.4
(58) Field of Classification Search .............. 248/101, 248/99, 95, 97, 100, 146; 141/391; 383/33, 383/35; 53/384.1; 198/803.4
See application file for complete search history.

(56) References Cited

U.S. PATENT DOCUMENTS

| 733,449 | A | * | 7/1903 | Willsie .......... 141/75 |
|---|---|---|---|---|
| 2,008,216 | A | | 7/1935 | Lombi |
| 2,106,028 | A | | 1/1938 | Heimsch et al. |
| 2,189,174 | A | | 2/1940 | Hohl |
| 2,703,671 | A | | 3/1955 | Kindseth |
| 2,759,643 | A | | 8/1956 | Dahlin |
| 3,010,619 | A | | 11/1961 | Gronemeyer et al. |
| 3,286,005 | A | | 11/1966 | Cook |
| 3,304,977 | A | | 2/1967 | Hammons |
| 3,855,907 | A | | 12/1974 | Johnson et al. |
| 3,924,008 | A | | 12/1975 | Ford et al. |
| 3,938,658 | A | | 2/1976 | Rohde |
| 4,078,717 | A | | 3/1978 | Stearley |
| 4,263,768 | A | * | 4/1981 | Russell et al. .............. 53/384.1 |
| 4,326,568 | A | | 4/1982 | Burton et al. |
| 4,361,235 | A | | 11/1982 | Gautier et al. |
| 4,423,583 | A | * | 1/1984 | Carey ...................... 53/384.1 |

(Continued)

FOREIGN PATENT DOCUMENTS

EP 1577223 9/2005

(Continued)

Primary Examiner—Anita M King
(74) Attorney, Agent, or Firm—Gifford, Krass, Sprinkle, Anderson & Citkowski, P.C.

(57) ABSTRACT

A holder with an integral gripper for transporting a flexible pouch during manufacturing is provided that includes a base plate, and a pair of opposed support members pivotally attached to the base plate. Each support member includes an upper leg member having a gripping means and a lower leg member. A moveable plate is parallel to and spaced apart from the base member by a spring member, and the moveable plate supports an outer end of the lower leg of the support member, so that walls of a flexible pouch are held in tension when the flexible pouch is supported by the gripping means. The walls of the flexible pouch are separated when the support members are pivoted inwardly.

14 Claims, 7 Drawing Sheets

U.S. PATENT DOCUMENTS

| | | | |
|---|---|---|---|
| 4,498,591 A | 2/1985 | Smith, II | |
| 4,519,499 A | 5/1985 | Stone et al. | |
| 4,690,304 A | 9/1987 | Morel | |
| 4,717,046 A | 1/1988 | Brogli et al. | |
| 4,808,010 A | 2/1989 | Vogan et al. | |
| 4,848,421 A | 7/1989 | Froese et al. | |
| 4,861,414 A | 8/1989 | Vogan et al. | |
| 4,867,131 A | 9/1989 | van der Merwe et al. | |
| 4,892,512 A | 1/1990 | Branson | |
| 4,905,452 A | 3/1990 | Vogan et al. | |
| 4,998,671 A | 3/1991 | Leifheit | |
| 4,999,978 A | 3/1991 | Kohlbach et al. | |
| 5,104,008 A | 4/1992 | Crisci | |
| 5,222,535 A | 6/1993 | Roders | |
| 5,267,591 A | 12/1993 | Wakabayashi et al. | |
| 5,377,873 A | 1/1995 | Minnette | |
| 5,433,526 A | 7/1995 | Wild et al. | |
| 5,465,707 A | 11/1995 | Fulcher et al. | |
| 5,485,714 A | 1/1996 | Montalvo | |
| 5,492,219 A | 2/1996 | Stupar | |
| 5,836,445 A | 11/1998 | Provonchee | |
| 5,845,466 A | 12/1998 | Laudenberg et al. | |
| 5,855,544 A | 1/1999 | Buchanan | |
| 5,906,438 A | 5/1999 | Laudenberg et al. | |
| 5,911,340 A | 6/1999 | Uematsu et al. | |
| 5,954,432 A | 9/1999 | Laudenberg et al. | |
| 6,039,218 A | 3/2000 | Beck | |
| 6,065,651 A | 5/2000 | Tedeschi, Jr. et al. | |
| 6,116,231 A | 9/2000 | Sabin et al. | |
| 6,199,601 B1 | 3/2001 | Laudenberg et al. | |
| 6,217,497 B1 | 4/2001 | Laudenberg et al. | |
| 6,241,122 B1 | 6/2001 | Araki et al. | |
| 6,276,788 B1 | 8/2001 | Hilton | |
| 6,422,753 B1 | 7/2002 | Thomas | |
| 6,439,429 B1 | 8/2002 | Gross | |
| 6,513,516 B2 | 2/2003 | Sabin et al. | |
| D474,682 S | 5/2003 | Berman | |
| 6,571,994 B1 | 6/2003 | Adams et al. | |
| 6,640,801 B2 | 11/2003 | Sabin et al. | |
| 6,651,848 B1 | 11/2003 | Redmond | |
| 6,719,015 B2 | 4/2004 | Murray | |
| 6,742,321 B2 * | 6/2004 | Gates | 53/570 |
| 6,886,308 B2 * | 5/2005 | Gates et al. | 53/385.1 |
| 6,935,492 B1 | 8/2005 | Loeb | |
| 6,981,614 B2 | 1/2006 | Niggemyer | |
| 2004/0206777 A1 | 10/2004 | Mertens | |
| 2005/0040181 A1 | 2/2005 | Kurosawa et al. | |
| 2007/0144113 A1 | 6/2007 | Murray | |

FOREIGN PATENT DOCUMENTS

| | | |
|---|---|---|
| JP | 10175649 | 6/1998 |
| JP | 11049186 | 2/1999 |
| JP | 11091807 | 4/1999 |
| JP | 2000281089 | 10/2000 |
| JP | 2000335594 | 12/2000 |
| JP | 2001048200 | 2/2001 |
| JP | 2001122206 | 5/2001 |
| WO | WO-2004054888 | 7/2004 |

* cited by examiner

HOLDER WITH INTEGRAL GRIPPER FOR TRANSPORTING A FLEXIBLE POUCH DURING MANUFACTURING

CROSS-REFERENCE TO RELATED APPLICATIONS

This application claims priority of U.S. Provisional Patent Application Ser. No. 60/792,407 filed Apr. 17, 2006, which is incorporated herein by reference.

BACKGROUND OF THE INVENTION

1. Field of the Invention

The present invention relates generally to flexible pouches for packaging a product and, more specifically, to a holder with integral gripper for transporting a flexible pouch during a manufacturing operation.

2. Description of the Related Art

Various types of disposable, portable containers are known in the art for storing a fluid or dry product, such as a liquid, granular material, powder or the like. Examples of containers include a cup, a metal can, a plastic bottle, a glass bottle or a flexible pouch. Consumers prefer the convenience of flexible pouches over other types of containers due to their shape, size, shelf life and storage adaptability. Manufacturers recognize the packaging benefits of a flexible pouch, since the pouch can be formed and filled on the same manufacturing line. An example of a method and apparatus for filling a flexible pouch with a product is disclosed in commonly assigned U.S. Pat. No. 6,199,601, which is incorporated herein by reference.

The flexible pouch is made from a flexible material, preferably a laminate composed of sheets of plastic or aluminum or the like. An outer layer of the material may include preprinted information, such as a logo or the like, to provide the consumer with information regarding the contents of the pouch. The pouch may be formed and/or filled using conventionally known manufacturing techniques, such as a horizontal form-fill-seal machine with a single or multiple lanes, a flat bed pre-made pouch machine, a vertical form-fill machine, or the like. The pouch includes a front panel joined to a back panel. Edges of the panels, such as a side edge, are joined together using a sealing technique such as bonding or welding.

During the fill/seat process, the pouch is transported through various fill and seal stations using a holder. An example of a type of holder includes a puck or cylindrical cup, into which the pouch is placed after it is formed. Another example of a holder is a gripper. The holder supports the pouch through the various fill/seal operations, such as opening, filling, sealing and finishing. The holder supports the weight and volume of the pouch and filler material. An example of a cup is disclosed in commonly assigned U.S. Pat. No. 6,719,015. To fill the pouch, the upper edges of the pouch are spread apart. A concentrated flow of gas may be directed towards the upper edge of the pouch to separate the panels assisted by suction cups and an inward movement of the grippers. The grippers are utilized at the same time to open the pouch. The filled pouch is pulled closed by the outward movement of the grippers and is sealed and finished.

In the past, a simple cup-shaped holder was utilized to transport the pouch, and separate grippers, such as suction cups, were utilized to open the pouch for filling purposes. While this system works, it utilizes several tools. Thus, there is a need in the art for a pouch holder with integral gripper for supporting, transporting, opening and closing of a flexible pouch during a fill and seal manufacturing operation.

SUMMARY OF THE INVENTION

Accordingly, the present invention is an apparatus for transporting a flexible pouch during manufacturing operations. The holder includes an integral gripper for transporting a flexible pouch during manufacturing. The holder includes a base plate, and a pair of opposed support members pivotally attached to the base plate. Each support member includes an upper leg member having a gripping means and a lower leg member. A moveable plate is parallel to and spaced apart from the base member by a spring member, and the moveable plate supports an outer end of the lower leg of the support member, so that walls of a flexible pouch are held in tension when the flexible pouch is supported by the pouch guide means. The walls of the flexible pouch are separated when the support members are pivoted inwardly.

One advantage of the present invention is that an improved automated machine is provided that includes a multipurpose holder for transporting a flexible pouch during fill/seal operations. Another advantage of the present invention is that the holder with integral gripper supports the pouch in an upright position and opens the pouch for filling. A further advantage of the present invention is that an improved process of filling and sealing a flexible pouch is provided that is more cost effective, since the pouch is opened and closed in a more reliable manner. Still a further advantage of the present invention is that a pouch holder with integral gripper is provided that shapes the pouch.

Other features and advantages of the present invention will be readily appreciated, as the same becomes better understood after reading the subsequent description taken in conjunction with the accompanying drawings.

DETAILED DESCRIPTION OF THE PREFERRED EMBODIMENTS

Figure 2:
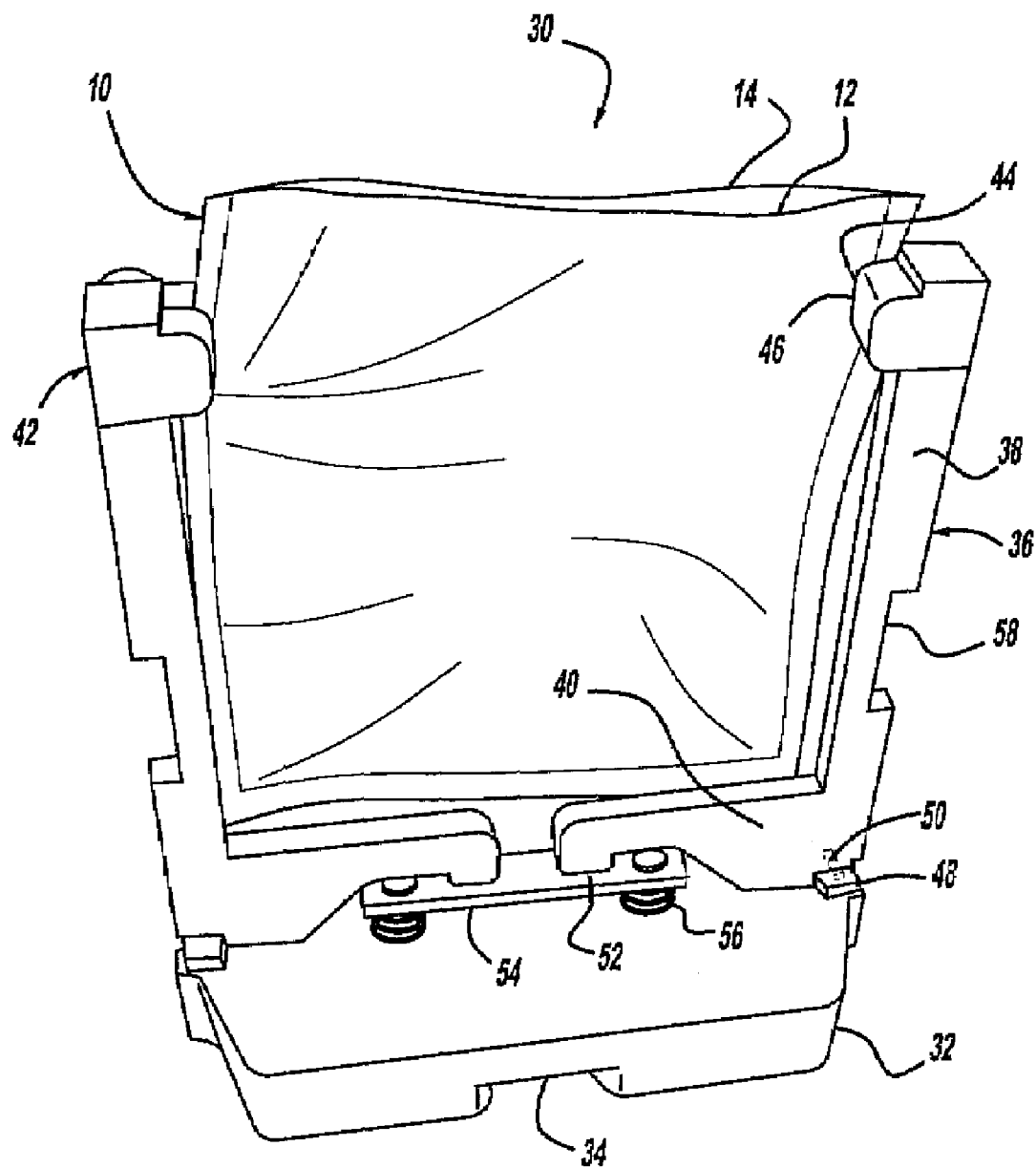
FIG. 2 is a front perspective view of a holder for transporting a flexible pouch during manufacturing operations, according to the present invention.
Figure 3:
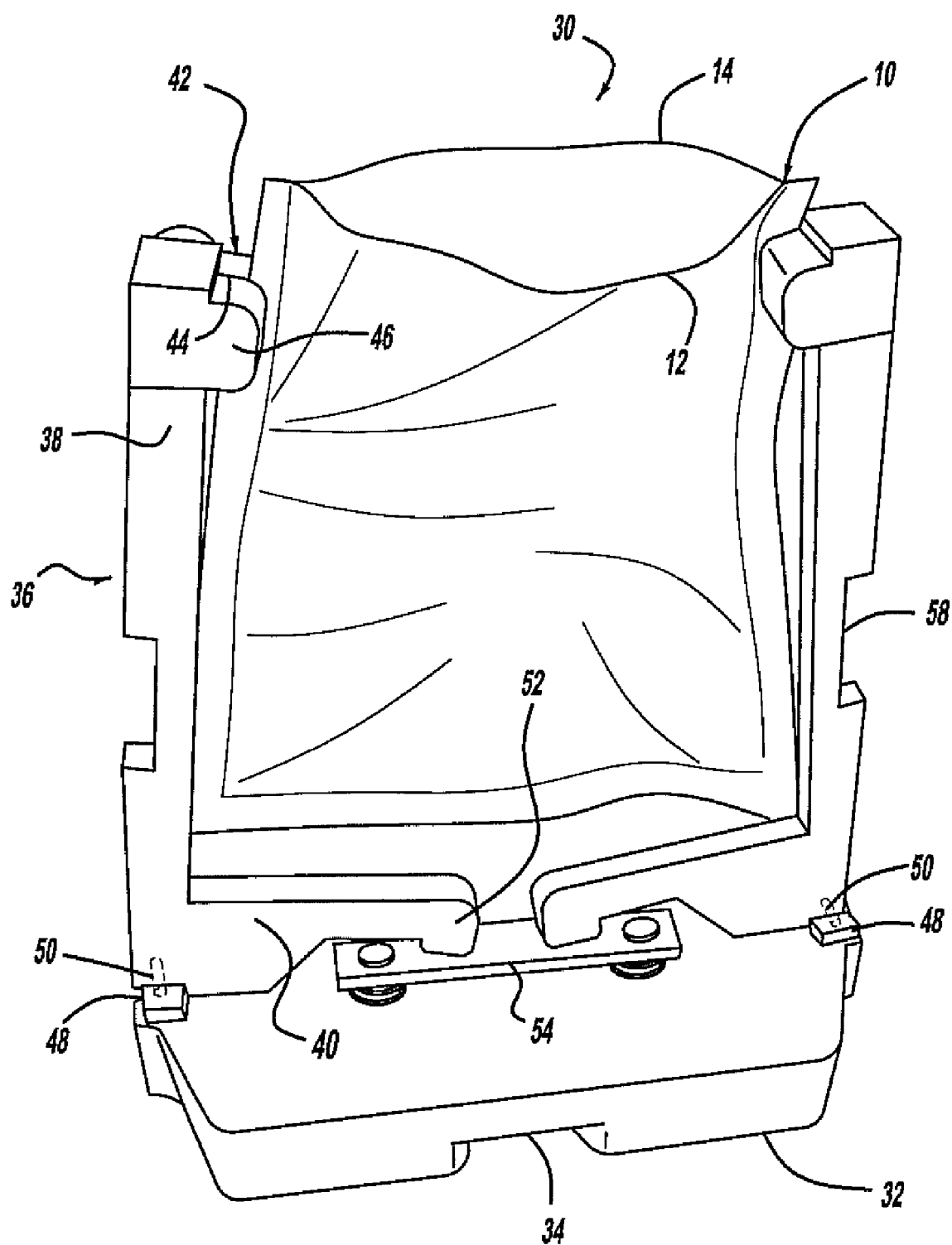
FIG. 3 is an elevational view of the holder of FIG. 2 in an opening position, according to the present invention.

Referring to FIGS. 2-3, a holder for transporting a flexible pouch 10 during a manufacturing operation is illustrated. In particular, the holder is illustrated in conjunction with a conventionally known automated machine for filling and sealing a flexible pouch. It should be appreciated that the pouch may be formed, filled and sealed on the same machine, otherwise it is formed on one machine and filled and sealed on another machine. An example of such a machine is described in commonly assigned U.S. patent application Ser. No. 10/310,221, which is incorporated herein by reference.

Figure 1:
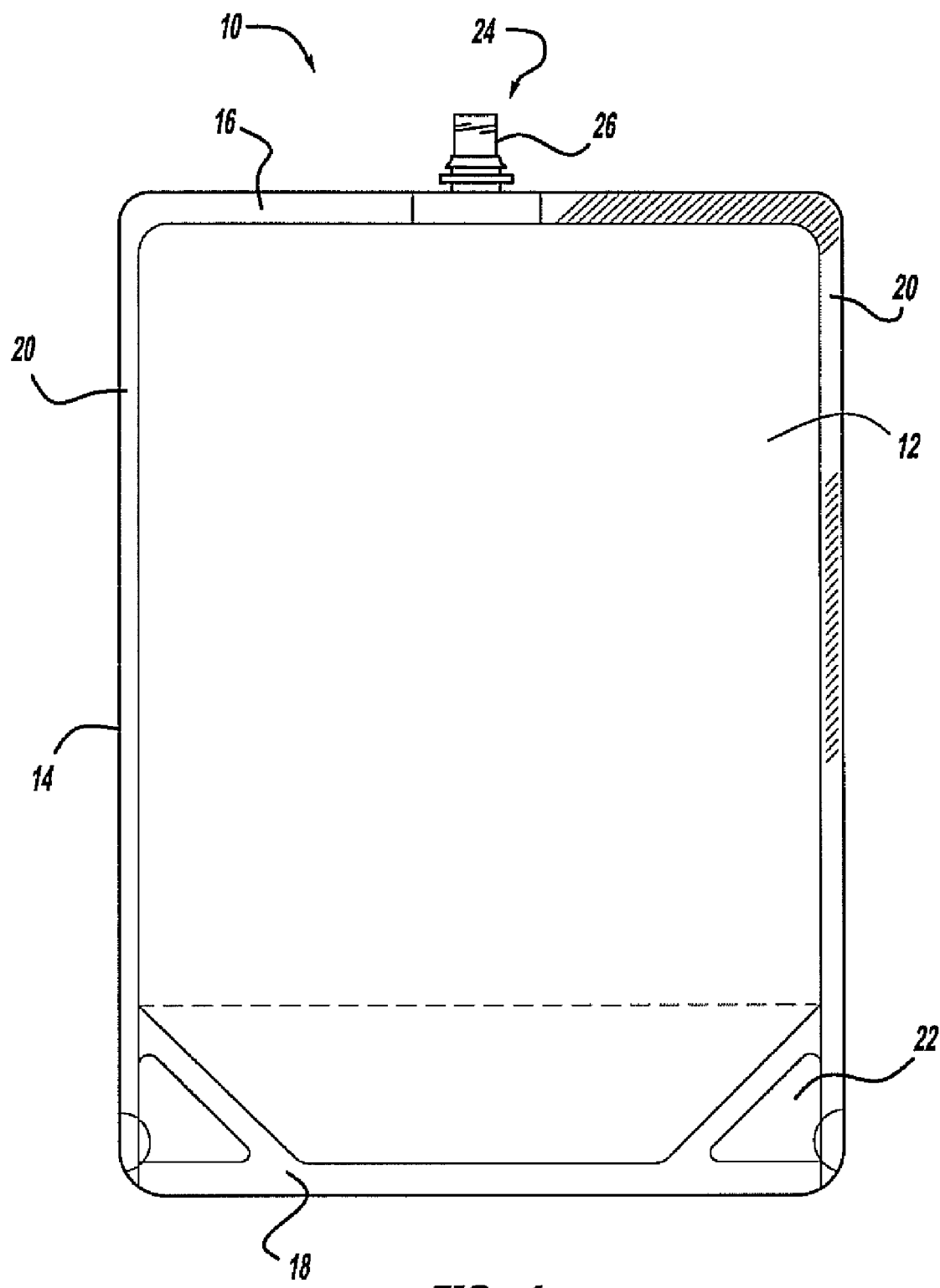
FIG. 1 is a front elevational view of a flexible pouch, according to the present invention.

Referring to FIG. 1, a flexible pouch 10 is illustrated. The pouch 10 may be filled with a product (not shown) and sealed. Various types of products are contemplated, such as a dry product or a fluid product. The type of product is unlimited, and could have a solid or a liquid form. In this example, the pouch 10 is a flexible stand-up pouch. In addition, the product may be a food item, or a non-food item. It is contemplated that the pouch may contain a single portion or multiple portions of the product. An example of a flexible pouch is disclosed in commonly assigned U.S. patent application Ser. Nos. 10/533, 615; 11/195,906; 11/551,071 and 11/454,241 which are incorporated by reference.

The flexible pouch 10 is preferably formed from a roll of preprinted material of laminate layers. The laminate material is typically a three, or four, or five gauge material, and is non-limiting. The outer layer is usually preprinted. Alternatively, at least a portion of the material may be not printed, i.e. translucent, in order to view the contents contained therein. The clear portion could be in a gusset or insert. An outer layer of material may include preprinted information on this outer layer may be a sleeve.

The choice of sheet layer material is non-limiting, and is influenced by factors such as the product contained in the pouch, the shape of the pouch, or the anticipated use of the pouch. One example of a laminate material structure includes at least one layer of virgin polyethylene terephthalate (PET), at least one layer of aluminum foil and another layer such as EVOH, PET, polyethylene or nylon or the like. Another type of laminate material structure may also include a metalized foil paper layer laminated to a cast polypropylene layer and another layer of PET, polyethylene or EVOH. There may be a fourth layer of nylon. Similarly, the laminate structure may include a cast polypropylene (CPP) layer, a polyethylene (PET) layer, a foil (AL) layer, a nylon (ONO) layer and another CPP layer. Another structure is the use of nylon, foil, nylon and cast polypropylene (ONO/AL/ONO/CPP) or CPP/NY/AL/CPP. Another example of a material structure is ONO/AL/COEX-ONO-LDPE. Material structures that include CPP are well suited for packaging a beverage, such as beer, wine or other carbonated fluids, to add strength to the walls of the pouch, preserve the carbonation, and protect the AL layer from cracking. Carbonation is beneficial since it acts as a microbiocide and preserves the flavor and aroma of the products. The use of cast polypropylene laminate material also assists in retaining the filled shape of the container, even as the product is removed from the pouch 10. The pouch 10 may have a generally cylindrical shape, similar to a traditional metal can, although other shapes are contemplated. A further example of a laminate material structure is CPP/AL/ONO/PE. This structure works well when the product has a short shelf life, and the nylon eliminates stretching or cracking of the AL layer.

It should be appreciated that if the filled carbonated pouch is stored at ambient temperature, the laminate will start to creep after a period of time, such as ten days. The laminate material may include an extrusion layer to contain "creepage" or "stretch" of the film after filling due to carbonation expansion, if the product is carbonated. In addition, the selected material may be organoleptic compliant in order to avoid the transfer of odor contaminants to the product, or product contamination during the shelf life period of the product.

The formed pouch includes a front wall 12 and a back wall 14. Each wall 12, 14 is further defined by an upper edge 16, an opposed lower edge 18, and side edges 20 extending therebetween the upper and lower edges 16, 18. The edges of the panel are joined along a seam. The pouch may include two side seams, or one single seam. In addition, the side edges 20 may be joined along a flat seam, or a "fin" style seam. In an example of a pouch formed using a single panel of material, the side edges 20, or joined along a flat center seam. In another example of a pouch formed from a single panel, the side edges are formed along one side seam. In an example of a pouch formed using two sheets of material, the edges are joined along two flat side seams. The panel has an inner surface that is adjacent the product, and an outer surface.

The pouch may include an insert, sidewall or gusset 22. The gusset 22 may be integrally formed in the panel, or a separate piece of material. The gusset may be disposed between the front and back walls, and positioned between the side edges of the walls, the lower edges, the upper edges, or any desired combination. The gusset may be functional, i.e. it may allow the pouch 10 to acquire another shape, such as cylindrical, or to stand upright. The gusset also enhances the strength and rigidity of the pouch 10 during filling and processing.

The pouch 10 includes an opening means 24 for accessing the contents of the pouch. Various types of opening means 24 are known in the art for this purpose. It should be appreciated that the opening means 24 may be incorporated into the pouch 10 prior to filling the pouch 10. One example of an opening means is a tear-off portion. The tear-off portion usually has an integral tear notch, typically formed near the upper edge, for accessing the product contained therein. Another example of an opening means 24 is a weakened, straw-pierceable portion in the pouch for receiving a straw. A further example of an opening means 24 is a pull tab covering an opening in the pouch. Yet another example of an opening means is a resealable zipper, such as a hermetic seal.

Still a further example of an opening means 24 is a removable and replaceable cap secured to a fitment 26. The cap and fitment may be positioned between the upper edges 16 or lower edges 18 of the pouch. The fitment 26 is sealed into the upper edges of the panel using a sealing means, such as an ultrasonic seal or a heat weld, or the like. The spout portion of the fitment 26 may include a removable seal to prevent leakage of the product or evidence of tampering.

The flexible pouch may include an outer layer or sleeve covering the outer surface of the pouch. The sleeve may be a label containing information about the product, such as a barcode or the like.

The flexible pouch may incorporate any of the above-described features in any combination. In addition, the finished pouch may assume various shapes, such as cylindrical, cubical, and conical, hourglass or the like, as influenced by the type of product and intended usage of the pouch.

It should be appreciated that the above-described flexible pouch may advantageously include other features that are known in the art. For example, the flexible pouch may include a guide pocket formed in a wall of the pouch prior to filling and sealing, to facilitate the separation of the front and back walls prior to the filling of the pouch. An example of such a pouch is disclosed in commonly assigned U.S. patent application Ser. No. 10/310,221.

It is also contemplated that the pouch may undergo a secondary process after it is filled with the product. For example, the filled pouch may be frozen. Alternatively, the filled pouch may be pasteurized in order to have an extended shelf stable life under ambient temperature. Examples of pasteurized food products include dairy products such as milk, or meat products such as chicken or the like.

Referring to FIGS. 2-3, an example of a holder 30 with an integral gripper for transporting and opening a flexible pouch is illustrated. The multipurpose pouch holder 30 includes a base plate 32 that is generally rectangular. A lower surface of the base plate 32 may include a recessed portion that forms a channel, as shown at 34 for engaging a transport means. For example, a finger portion of the transport means may be fittingly disposed within the recessed portion of the base plate. The base plate 32 may also include other features, such as an integrally formed spacer positioned on each end (not shown), for assisting the multipurpose pouch holder around curves, bends or the like along the transport means.

A pair of opposed support members 36 are pivotally attached to the base plate, and project upwardly from an upper surface of the base plate. The support members 36 are spaced a predetermined distance apart from each other. The predetermined distance is selected so that the walls of the pouch, once filled, are maintained in tension, to keep the pouch closed until sealed.

Each support member generally has an "L" shape. The support member includes a vertically oriented upper leg 38 attached to a horizontally oriented lower leg 40. The upper leg 38 includes a gripping means 42. In this example the gripping means 42 is a longitudinally extending guide channel 44 located in a portion of an inner surface 38a of each upper leg, and each guide channel is preferably positioned directly across from one another. In another example, the guide channel 44 is located in a finger-like projection integrally formed in an upper end of the upper leg 38. The edges of the pouch are held within the pouch guide means 42, so that the pouch 10 is supported between the upper legs 38. In a further example, the guide channel 44 extends the length of the upper leg 38.

A lower edge of the support member is pivotally attached to the base member, as shown at 48. The support member is pivotal about a pivot point, shown at 50. An outer end of the lower leg is supported by a movable plate 54, as shown at 52. The movable plate 54 is a generally planar member positioned between each support member, such that it is parallel to, and spaced apart from the base member. The movable plate 54 is supported by a spring member 56. In this example, each end of the movable plate 54 is supported by a spring member 56. In another example, the movable plate 54 is supported by one spring member 56. The spring member 56 in this example is a compression spring. One end of the spring member 56 is attached to the movable plate, and the other end of the spring member 56 is attached to the base plate 32.

The support member may include a notched section 58 formed along an outer surface of the upper leg 38 for receiving a pushing means (not shown) for pivotally moving the support members 36.

In operation, the edges of the pouch 10 are dropped through the corresponding guide channel 44 in each support member 36, so that the pouch 10 is supported between the support members 36. The edges of the pouch 10 are tightly gripped, so that the walls 12, 14 of the pouch 10 are held in tension. The pouch 10 is opened by applying a force to the upper leg, such as at the notched portion 58, that causes the upper legs 38 to pivot inwardly towards each other, and the lower leg 40 pushes the movable plate in a downward direction, as shown in FIG. 3. The walls 12, 14 of the pouch 10 separate as a result of the movement of the support members, in order to open the pouch 10. It should be appreciated that other opening means, such as a blowing apparatus or diving wand, or vacuum cups or the like, may be utilized to further open the pouch. The support members are maintained in the pivoted position, to hold the pouch open as the pouch is filled at a filling station. Once the pouch is filled, the force to the upper leg is released, the spring force raises the movable plate 54 and outer end of the leg member, and the support member 36 returns to the initial position. The walls 12, 14 of the pouch 10 come together. The pouch 10 can be positively closed in a sealing operation.

Figure 4:
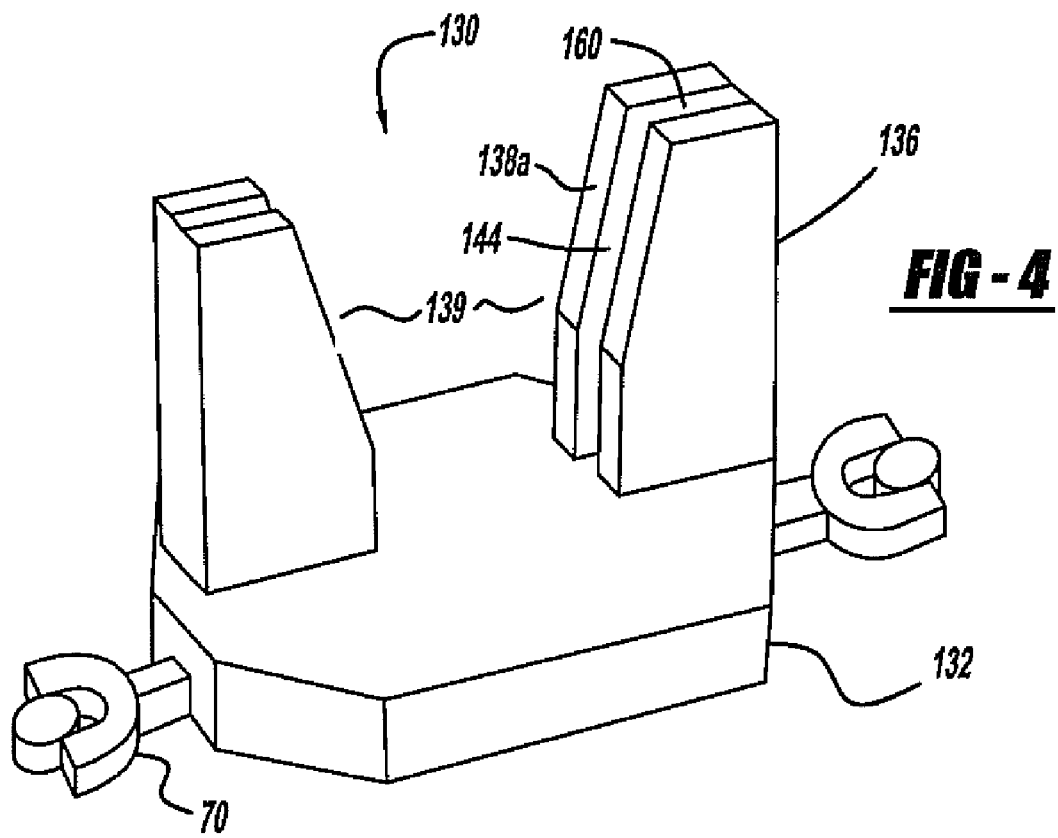
FIG. 4 is a front perspective view of another embodiment of a holder for transporting a flexible pouch during manufacturing operations, according to the present invention.
Figure 6:
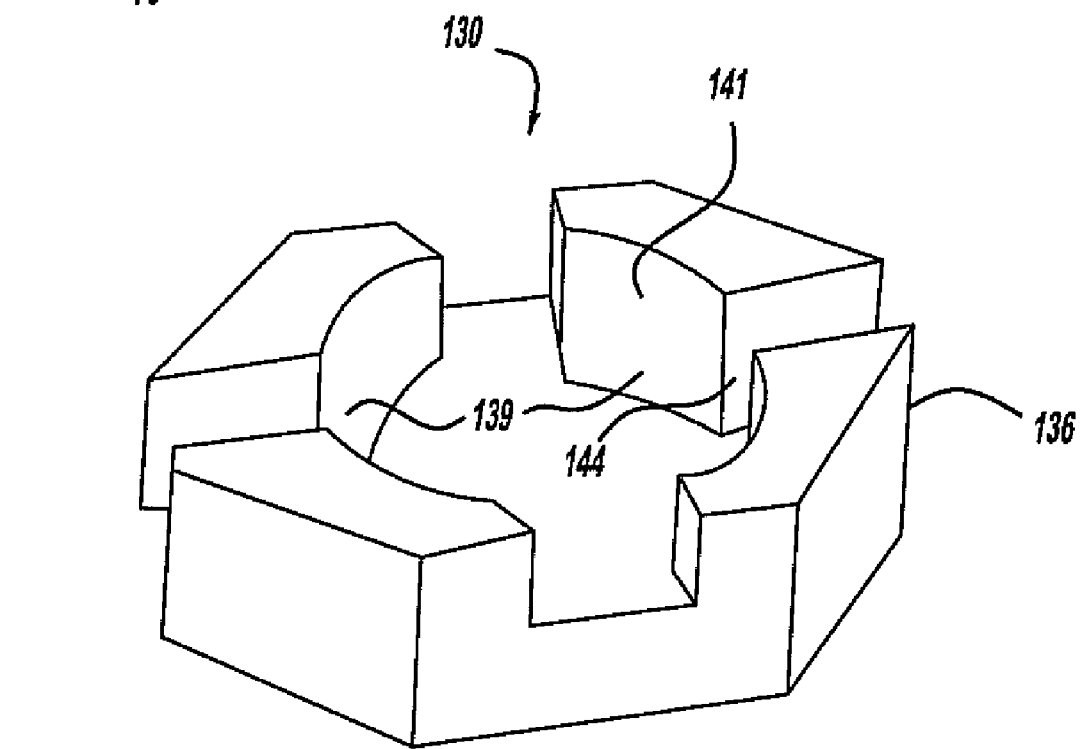
FIG. 6 is another example of the holder of FIG. 4, according to the present invention.
Figure 5:
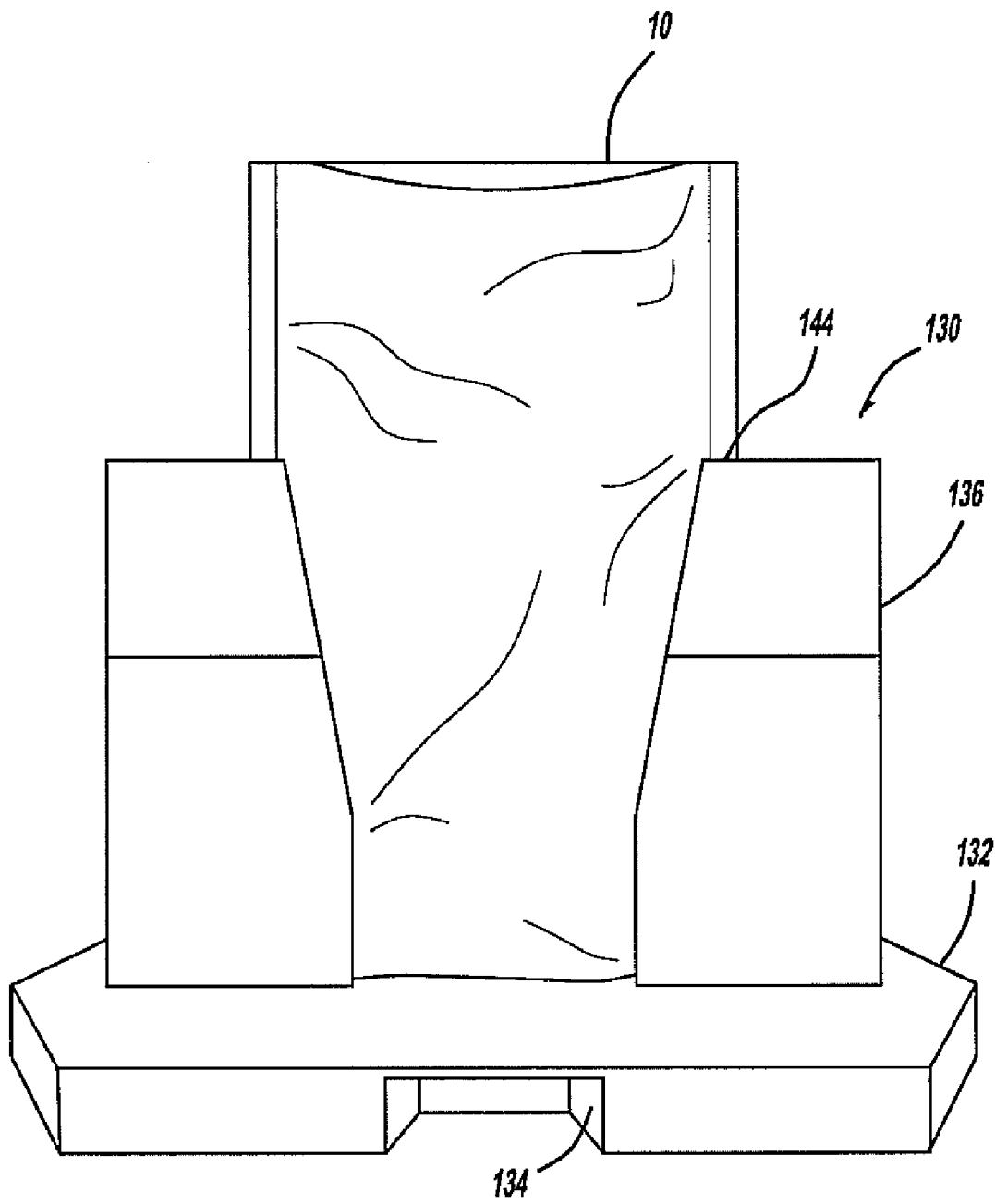
FIG. 5 is another front perspective view of the holder of FIG. 4, according to the present invention.

Referring to FIGS. 4-6, another embodiment of a holder 130 with integral gripper for transporting a flexible pouch 10 during a manufacturing operation is illustrated. Like features have similar reference numerals increased by 100. During manufacturing of the pouch on an automated machine, the pouch is transported to the various stations of the machine using a pouch holder 130 that is removably secured to a transport means 170, such as a conveyor belt, an arm, or a turret, or the like, for moving the pouch holder 130 between stations. In this example, a conveyor belt is illustrated.

The pouch holder 130 includes a base plate 132 that is generally rectangular. The base plate 132 includes a recessed portion or channel 134 for engaging the transport means 170. For example, a finger member of the transport means may be fittingly disposed within the recessed portion 134 of the base plate 132 in order to transport the base plate 132 between the stations. The base plate 132 may also include an integrally formed spacer positioned on each end, for assisting the pouch holder around curves, bends or the like in the conveyor.

A pair of vertically oriented support members 136 are attached to the base plate and project upwardly from an upper surface of the base plate. The support members 136 are spaced a predetermined distance apart from each other. The predetermined distance is selected in order to achieve a predetermined shape of the pouch when finished.

Each support member is generally rectangular. An inner surface 138a of each support member includes a longitudinally extending guide channel 144 for gripping the pouch, and each guide channel 144 is preferably positioned directly across from one another.

Each support member 136 is configured to form a predetermined shape of the pouch when the pouch is filled, as shown in FIG. 5. For example, the distance between each support member, or height of the support member is selected to assist in shaping the pouch in a manner to be described. Also the shape of opening between the support members assists in shaping the filled pouch as shown at 139. In this example, the inner wall 138a of the support member 136 tapers inwardly, with the shortest dimension between the lower ends of each of the support members 136 and the longest dimension between the upper ends of the support members 136. The inner wall 136a may have a radius 141, to form a cylindrical pouch, as shown in FIG. 6.

A second guide channel 160 may be formed in an upper end of the support member 136. The upper guide channel 160 assists in positioning the pouch 10 within the vertically oriented guide channel 144. In this example, the second guide channel 160 has a "V" shape.

The pouch 10 is dropped through the second guide channel 160 and first guide channel 144 and is positioned between the support members 136. The outer edges of the pouch 10 are pushed slightly inwards, due to the shaping of the guide channel 144. As the pouch is opened, the pressure inside the pouch increases, further pushing the walls 12, 14 of the pouch 10 outwards around the inner surface 138a of the support member, to thus form the shape of the pouch 10. The pouch 10 may assume a variety of shapes, including cylindrical, square, rectangular, elliptical or the like. The pouch is then filled and sealed.

Figure 7:
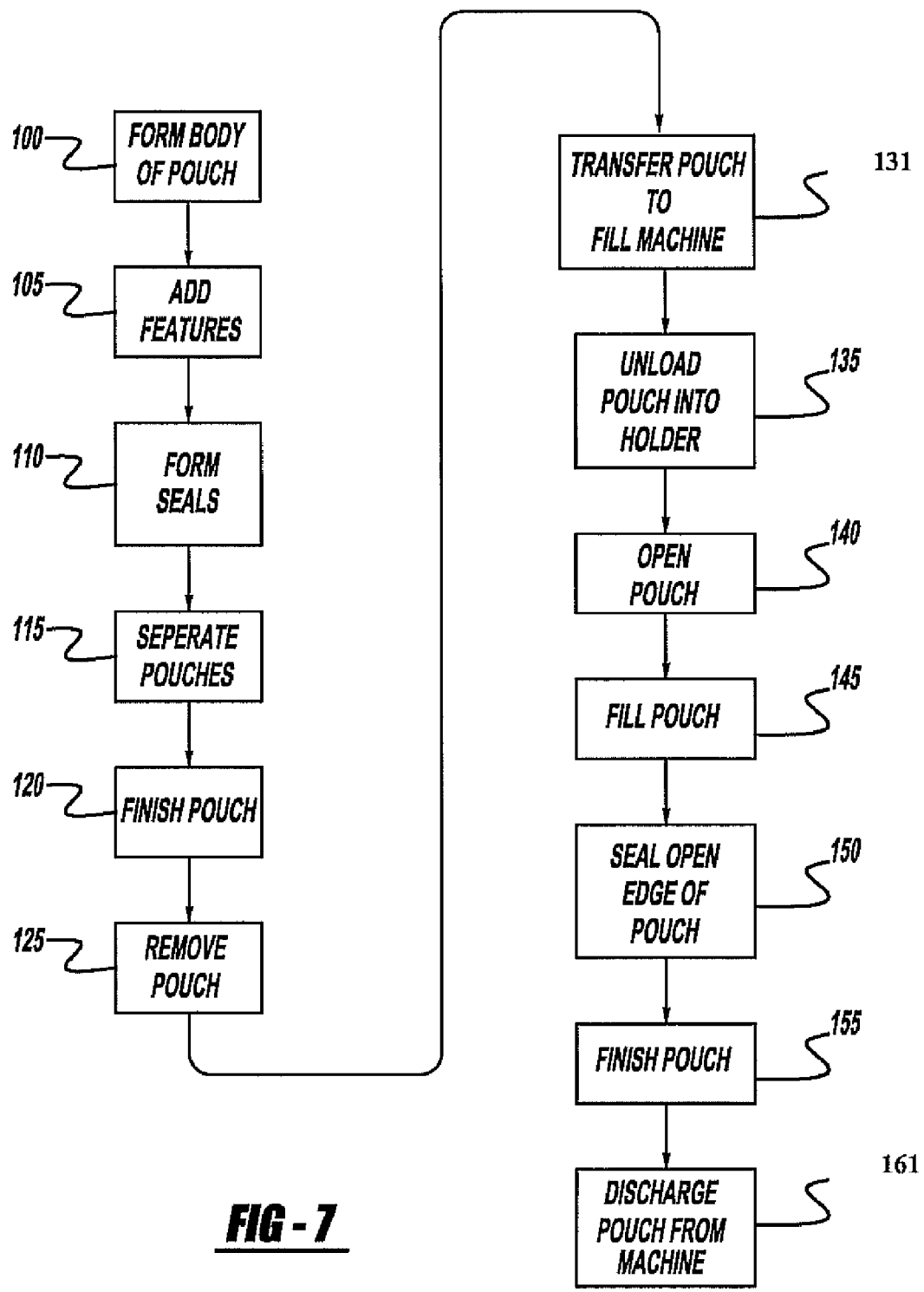
FIG. 7 is a method of forming, filling and sealing the flexible pouch, according to the present invention.
Figure 8:
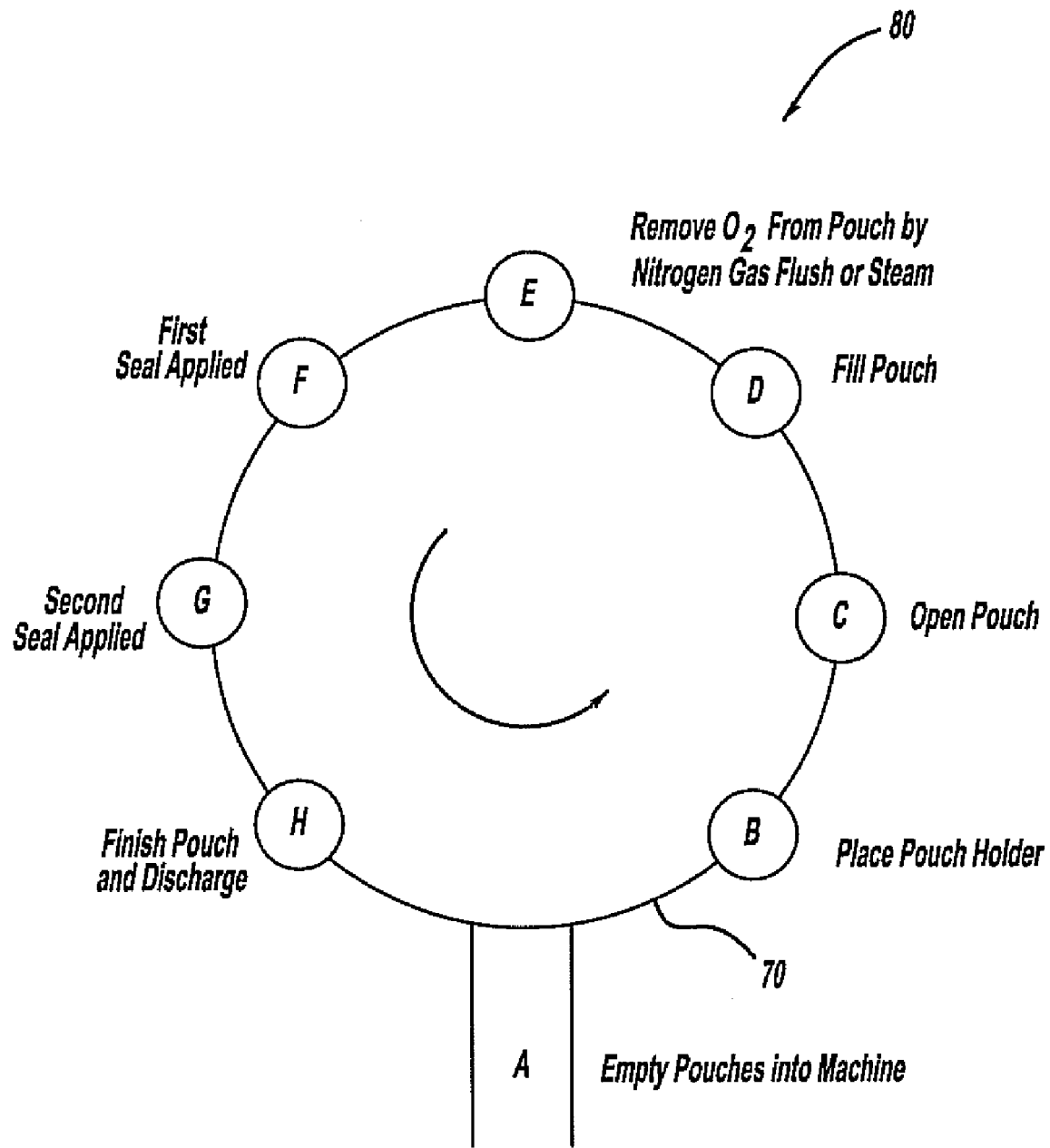
FIG. 8 is an example of an apparatus for filling the flexible pouch using the holder, according to the present invention.

Referring to FIG. 7, a method for forming and filling the flexible pouch using a high-speed machine, such as that described with respect to FIG. 8, is illustrated. The flexible pouch 10 described above is referenced by way of example. The method begins in block 100 at a first station with the step of forming the body of the pouch 10. For example, a roll of laminate material, as previously described, is unrolled along a horizontally oriented plane. The initial width of the roll of material is determined by the desired finished size of the pouch 10 and the number of pouches to be obtained from the width. For example, three or four or six pouches, representing six to twelve panels, can be obtained from a width of the roll of material on a three-lane machine or four-lane machine, respectively. Each panel has an inner surface and an outer surface. One layer of the material is preferably preprinted with information or locating indicia (not shown), such as a registration mark. The registration marks are located on the material to denote an edge of a wall 12, 14. The registration marks are read by an optical reading device (not shown), such as a scanner, to index the material in a predetermined position at the cutting station. The preprinted information may include labeling information that describes the product contained within the pouch. In this example, the layer of preprinted information is located on an outer layer of the material.

The methodology advances to block 105 and a feature, such as a gusset 22 or insert, is optionally positioned between the aligned first and second unrolling sections of material. In addition, an opening means may be applied at this time. For example, an opening means 24, such as a press-to-close zipper, may be positioned between the panels. Another opening means 24 such as a straw hole, patch or tear notch may be applied.

The methodology advances to block 110 and the edges of the walls are sealed. The side edges or lower edge may be sealed. Various techniques are contemplated for sealing the edges together. For example, an adhesive may be used to seal the first and second edge of the flat seam together. Alternatively, the edges may be sealed using an ultrasonic sealing process. Another technique is a heat weld that includes the application of heat and compression.

In still another example, the edges are sealed using a seal bar or forming plate having a plasma coating. One advantage of the plasma coating is that the line speed may increase. Another advantage is that the coating makes the surface of the seal bar or forming plate more resilient. When the seal bar is heated, the coating expands due to this resiliency. The shear stress on the inner edge of the seal is reduced; resulting in reduced creepage of the material and greater durability of the seal. The plasma coating reduces the opportunity for potential damage to the material during the sealing step. In this example, the plasma coating is a smooth, hard plastic that mimics glass. Since the outer layer of material is not weakened, there is no creepage of the outer layer.

In still another example of a sealing technique, the side seal is a two-step seal. The two-step seal advantageously avoids the generation of ketones due to application of heat to the material. The first or inner seal is a low temperature seal. The second or outer seal is a high temperature seal. The second seal is spaced apart from the first seal by a predetermined distance, to create an air gap. The first seal is a tack seal, such as 6 mm wide, and is of a sufficient temperature so as to melt the layers of material and tack the edges together. The predetermined distance between the first and second seal is ½-1 mm. The second seal is applied at a higher temperature and pressure than the first seal. As a result, any gas, such as steam, ketones, aromatics or the like are pushed in an outwardly direction, out through the open edges of the panels, and not into the pouch. Thus, the first seal prevents entry of contaminants into the pouch to avoid organoleptic contamination.

The methodology advances to block 115, and the section of pouches formed in the roll width of material are separated from each other in a cutting operation. For example, each section of material may be first separated along its width, i.e. along the side seam of the pouches. The section is then separated into individual pouches. In this example, the width of unrolling represents the side edges. The material is cut using a known cutting apparatus, such as a laser or punch or the like. The material is cut into a pouch 10 using a known cutting apparatus, such as a laser or punch or the like. The cutting apparatus forms a single cut in the material to separate the pouches. The length of the pouch 10 is controlled by the distance between the cuts.

Alternatively, two pouches 10 are cut out at one time by adding a double cut between two cuts, preferably in the center. Advantageously, forming two pouches during the cutting operation effectively doubles the assembly line speed.

It should be appreciated that the upper edge or lower edge may be further trimmed. For example, the end of the pouch may be trimmed to accommodate a fitment 26. In another example, two legs are formed during the trimming operation, in order to recess the fitment. The fitment may be ultrasonically sealed to the pouch.

The methodology advances to block 120 and the individual pouches are finished. For example, an opening means 24 may be applied to the pouch 10 at this time. A fitment, as previously described, may be sealed within the walls of the pouch 10, such as between the upper edges 16. The fitment may be sealed using an ultrasonic seal, or a heat weld, or by a combination of ultrasonic seal and heat weld. In addition, an insert 72 may be likewise applied to the pouch 10 at this time. In another example, a lower edge of the pouch 10 may be trimmed to shape, i.e. the corners may be angled. This operation may be performed using a cutter or a die cut or the like. In still another example of a finishing operation, a crease or guide pocket may be formed in a top portion of each wall 12, 14 in a creasing operation, in order to later facilitate opening and filling of the pouch. An example of a method of forming a crease in a wall to facilitate opening the pouch is disclosed in commonly assigned U.S. patent application Ser. No. 10/310,221, which is incorporated herein by reference. It should be appreciated that the shape of the finished pouch is non-limiting, and may be round, square, oval, triangular or the like. In still another example of a finishing operation, the sleeve is applied over the individual pouch and shrunk to fit using an application of heat to the pouch.

The methodology advances to block 125 and the pre-made pouch 10 is then removed from the form machine. The completed pouch may include any combination of the previously described features. The methodology advances to block 131 and the completed pouches may be loaded into a carrier and transferred to a filling machine. It should be appreciated that the filling machine may be integral with the pouch forming machine, or a separate machine. This portability increases the flexibility of the pouch and may result in a manufacturing cost savings.

The methodology advances to block 135, and the pouch is unloaded from the carrier and placed in the previously described holder 30 for moving the pouch 10 between stations. The pouch 10 is dropped through the guide channel 44 and is gripped between the support members 36. The outer edges of the pouch 10 are held so that the walls 12, 14 of the pouch 10 are in tension. The methodology advances to block 145.

In block 140, the pouch 10 is opened in an opening operation. For example, the pouch 10 may be opened by pushing on the support member 136 to pivot the upper legs 38 of the support members 36 inwardly towards each other, to separate walls 12, 14 of the pouch 10. In another example, a guide pocket formed by the crease in the front wall 12 and back wall 14 facilitates opening of the pouch. In still another example, a nozzle (not shown) may be mechanically lowered into the guide pocket to direct a stream of compressed gas into the guide pocket, to force the walls of the pouch 10 away from each other. An example of a gas is carbon dioxide or nitrogen, or the like. In a further example, a blowing station may include a manifold, with a hood extending over the top of the edges of the pouch as known in the art. The manifold has rows of apertures (not shown) formed above the upper edges 16 of the pouch 10. The hood is placed over the pouch 10 to assist in maintaining the air pressure in the pouch 10. The supply of pressurized gas is directed through the aperture to form a plurality of jets of pressurized gas or air. The jets are directed downwardly at the diamond-shaped openings formed at the upper edges 16 to assist in overcoming the surface tension of the pouch and assist in separation of the walls 12, 14. In still a further example, a diving rod (not shown) may then be used to make sure the pouch 10 is fully opened. After the pouch is opened, it may be injected with super-saturated steam to eliminate any pathogens or the like. The support members hold the pouch open as the pouch is filled at a filling station. The methodology advances to block 145.

In block 145, the pouch 10 is filled with the product in a filling operation. For example, a fill tube (not shown) is lowered into the opened pouch 10 and the product is dispensed into the open pouch 10.

If the product is naturally carbonated, such as beer or soda or the like, the pouch is preferably filled while immersed in a nitrogen atmosphere. If the product is not naturally carbonated and carbonation is desirable, it is immersed in a carbonator to introduce carbon dioxide into the product. For example, carbon dioxide is introduced into cold water or juice to provide a carbonated beverage. The product may contain a mixture of up to four volumes of carbon dioxide. It should be appreciated that the carbon dioxide masks any undesirable taste from ketones and other solvents released during the sealing process. The carbon dioxide also increases the pressure within the product so that the walls of the pouch are rigid after the top is sealed. The product is preferably filled at a temperature ranging from 29° F. to ambient temperature. The methodology advances to block 150.

In block 150, the filled pouch is sealed. For example, after the pouch is filled, the pushing member releases the pressure on the support member and the support member returns to the initial upright position. As a result, the walls of the pouch come together, and the pouch is positively closed in a sealing operation. For example, if the pouch is filled through open edges, the open edge of the pouch 10 is closed by applying a closing seal. The closing seal may be an ultrasonic seal, or an ultra pulse seal, or a heat weld or the like. If the pouch holds a carbonated beverage, the pouch may be sealed as described in commonly owned PCT Patent Application No. PCT/US03/034396 which is incorporated herein by reference. In the example of a carbonated beverage, the first seal is an ultrasonic seal or an ultra pulse seal.

A second seal 96 may be applied. For a carbonated product, the second seal is spaced apart from the first seal. Some of the product may be trapped between the first and second seals. This is advantageous since there is no gas in the head space, i.e. the region between the product and the heat seal, and less pouch material is required. The first closing seal is a tack seal, and the second closing seal is a high pressure, high temperature seal, and may be a heat weld or an ultrasonic seal. In another example, the second seal is a cosmetic seal. It should be appreciated that the filled and sealed pouch may be shaped by the shape of the opening between the holder support members.

The methodology advances to block 155 and the pouch 10 is finished in a finishing operation. For example, the edges 16, 18, 20 of the pouch 10 are trimmed to achieve a predetermined shape. In addition, the pouch 10 may be cooled at a cooling station, where the pouch 10 is cooled using a conventionally known cooling technique. Optionally, the sleeve may be placed over the filled pouch and shrunk to fit over the pouch by applying heat. The sleeve layer forms an outer layer of the pouch. The methodology advances to block 161.

In block 161 the filled pouch 10 is discharged from the machine. A plurality of pouches may be placed in a package for sales or shipping purposes.

It should be appreciated that the pouch may undergo other processing steps, such as such as an upstream oxygen purging station, downstream oxygen purging station, pasteurization or the like. For example, the filled pouch 10 may be pasteurized in integral retort chamber (not shown) that heats and then cools the pouch 10. The pouch 10 may be tested, such as burst testing or the like, prior to packaging for shipping. These additional processing steps may take place at a station on the form/fill/seal apparatus, or on another apparatus.

It should be appreciated that the order of steps may vary depending on the pouch and its features. Also, a particular manufacturing station may perform one or a plurality of operations, to enhance the efficiency of the methodology and apparatus.

Referring to FIG. 8, an example of a fill-seal machine 80 for carrying out the method described with respect to FIG. 7 is illustrated. The fill/seal machine illustrated is by way of example, and other arrangements and types of stations may be utilized. It should be appreciated that a particular manufacturing station may perform one or more operations. It should also be appreciated that the order of operations may vary. The pouch holder with pouch is shown moving through various predetermined stations, as labeled. It is foreseeable that the pouch holder and pouch may pass through other stations or operations that are conventionally known in the art, such as a finishing station or the like. The fill-seal machine 80 may be configured as a flat bed, a conveyor, a rotary turret or the like. An example of a flat bed form machine is manufactured by Nishibe, such as the model number SBM500, SMB600 or SMB700. It should be appreciated that the fill-seal machine may be integral with the form machine, or a separate machine. The machine may contain a single lane, or multiple lanes.

As shown in the "A" operation, the carrier with the pouch is loaded into the holder 30. For example, the empty holder is 30 is engaged by the transport means 70. In this example a finger-like projection in the transport means 70 is disposed within the notch in the base of the pouch holder.

In operation "B", a pouch 10 is dropped into the pouch holder 30 and held by the vertically oriented guide channel. A gripper may be used to lower the pouch into the holder. As previously described, the walls of the pouch may be initially held in tension.

The pouch holder 30 is transported along the conveyor belt to operation "C", and the pouch is opened in an opening operation. For example, the support members pivot inwardly, to separate the walls of the pouch. The lever arms assist in maintaining the pouch in an open position. In another example, techniques conventionally known in the art for further opening of the pouch 10 are utilized. For example, the guide pocket formed by the crease in the front panel and back panel facilitates opening the upper edges of the pouch. In another example, a nozzle may be mechanically lowered into the pouch to direct a stream of compressed gas downwardly into the pouch to force the walls of the pouch away from each other to further open an upper edge of the pouch. An example of a gas is carbon dioxide or nitrogen.

In still another example, a blowing station may include a manifold, with a hood extending over the top of the edges of the pouch. The manifold has rows of apertures (not shown) formed above the upper edges of the walls of the pouch. The hood is placed over the pouch to assist in maintaining the air pressure in the pouch. The supply of pressurized gas is directed through the aperture to form a plurality of jets of pressurized gas or air. The jets are directed downwardly at the diamond-shaped openings formed at the upper edges to assist in overcoming the surface tension of the walls and assist in separation of the walls. A diving rod may then be used to make sure the pouch is fully opened.

The pouch holder is then transported to a filling station, as indicated at operation "D", and the open pouch is filled with a product by a fill nozzle in a filling operation. In this example, the fill nozzle is lowered into the opened pouch, and the product is dispensed into the opened pouch. The nozzle dispenses a predetermined amount of product into the opened pouch. The product may be dispensed into the opened edges of the pouch or through a fitment. In this example, the fill nozzle is lowered into the opened pouch, and the product is dispensed into the open pouch. Depending on the size of the pouch, there may be two fill stations. In the example of a shaped pouch holder, the addition of material into the pouch further increases the pressure within the pouch, causing the walls of the pouch to move outwardly around the walls of each support member. In this way, the filled pouch assumes a desired shape.

If the product is naturally carbonated, such as beer or soda or the like, the pouch is preferably filled while immersed in a nitrogen or carbon dioxide atmosphere. The pouch may be flushed with nitrogen or carbon dioxide or a mixture of both. If the product is not naturally carbonated, it is immersed in a carbon dioxide process to introduce carbon dioxide into the product. For example, carbon dioxide is introduced into cold water or juice to provide a carbonated beverage. The product may contain a mixture of up to six volumes of carbon dioxide. It should be appreciated that the carbon dioxide masks any undesirable taste from ketones and other solvents released during the sealing process. The carbon dioxide also increases the pressure within the product so that the walls of the pouch 10 are rigid after the top is sealed. The product is preferably filled at a temperature ranging from 29° F. to ambient temperature. The carbonation is advantageous as a microbiocide which can enhance the flavor or prevent mold or contamination.

After filling, the pouch 10 is transferred to a station "E" for removing any oxygen from the headspace of the pouch, such as by using a nitrogen gas flush or steam, The pouch is then transferred to a sealing station and the open edges of the pouch are sealed, as indicated at operation "F". For example, the pressure in the support member may be released, to bring the open edges of the pouch together. In another example, the grippers are utilized to close the pouch by pulling the edges tightly together. This allows for a modified atmosphere process (MAP), whereby a gas may be injected in the pouch, and as a result of the gripper position, the pouch is partially closed around the diving nozzle as the top seal is applied, trapping the gas inside the pouch.

In a further example, the lifting surface ends, causing the lever arms to return to their original position, and the pouch to close. It should be appreciated that the filled pouch might return to a partially closed position due to the product contained therein. The upper edges of the pouch are sealed together as previously described. The first seal may be a thermal seal. For example, a heat-sealing member extends therethrough a slot in the sides of the holder, to seal the upper edge of pouch. As previously described the heat sealing member may have a plasma coating.

Another example of a first seal for a carbonated product utilizes an ultrasonic sealing process. Preferably the ultrasonic seal includes sound waves and is formed using a horn and anvil. A second seal, if utilized, may be applied at a second sealing station "G". The second seal may be applied using a heat seal means to form a second heat seal over the first seal. It should be appreciated that the second seal may be spaced slightly above the first seal. The second heat-sealing station is conventional and utilizes heat or a combination of heat and pressure to form the seal. The second seal may also be a cosmetic seal or another type of seal, such as ultrasonic, ultra pulse or the like. The first and second seals are applied for a carbonated product as disclosed in commonly assigned Patent Application No. PCT/US03/34396, which is incorporated herein by reference.

The pouch is transferred to a finishing station as shown at "H" for finishing and removal from the filling machine. For example, the pasteurized pouch 10 may be cooled. A tear notch may be formed in the pocket portion of the pouch to facilitate opening the pouch to access the product in the pouch. A cooling top seal may be applied. In another finishing operation, the edges of the pouch are trimmed to achieve a desired shape. The finished pouches may be discharged into a package. For example, grippers may be utilized to place the pouch in a box for shipment.

If desired, the pouch may be transferred to a pasteurization station. Pasteurization enhances the shelf life of the product. The pouch is inserted into an enclosed retort chamber. Air is extracted from the chamber, such as using a vacuum source. The product inside the pouch is pasteurized. For example, a combination of steam and water is used to heat the pouch to a predetermined temperature for a predetermined period of time to pasteurize the product contained within the pouch. The package is then cooled. In this example, recirculated water surrounds the pouch to cool the pouch. In certain instances, it may be desirable to apply steam to sterilize the pouch 10 and to wet the inner surface of the walls to facilitate handling.

It should be appreciated that the automated machine may include other operations. For example, the filled pouch may be transferred to another conveyor belt, or otherwise collected. Alternatively, other stations may include a straw pierceable opening station, an upstream oxygen purging station, downstream oxygen purging station, or the like. In addition, a manufacturing station may perform one or a plurality of operations, to enhance the efficiency of the methodology.

Another example of a machine for carrying out the above-described method is of a turret-type having radially extending arms. Each arm carries a predetermined number of holders, and there may be a plurality of holders positioned on each arm. It should be appreciated that a particular manufacturing station may perform one or more operations. It should also be appreciated that the order of operations may vary.

Another example of a fill machine is a continuous motion machine. The continuous motion machine has rows of holders. The holders are mounted to a conveyor which is moved in an elliptical path past the same stations as set forth for the rotary machine above. A plurality of multipurpose holders may extend across a row. Preformed pouches are fed from magazines located above the receptacles. The various operations such as opening, checking, filling and sealing are performed by apparatus which moves over the holders at the same speed as the holders.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

The invention claimed is:

1. A holder with an integral gripper for transporting a flexible pouch during manufacturing, said holder comprising:
    a base plate;
    a pair of opposed support members directly attached to the base plate and annularly pivotal inward and outward relative to the base plate, wherein each support member includes an upper leg member having a gripping means for gripping the pouch, and a lower leg member;
    a moveable plate that is parallel to and spaced apart from the base plate by a spring member, wherein the moveable plate supports an outer end of the lower leg of the support member, so that walls of the flexible pouch are held in tension when the flexible pouch is supported by the gripping means, and the walls of the flexible pouch are separated when the support members are pivoted inwardly.

2. The pouch holder as set forth in claim 1 wherein the support members are spaced a predetermined distance apart so that the walls of the flexible pouch are initially held in tension.

3. The pouch holder as set forth in claim 1 wherein the gripping means is a guide channel formed in an inner surface of the upper leg member.

4. The pouch holder as set forth in claim 1 wherein the gripping means is a finger member integrally formed in an upper end of the upper leg, and having a guide channel disposed therein.

5. The holder as set forth in claim 1 wherein the outer end of the lower leg is supported by the movable plate.

6. The holder as set forth in claim 1 wherein each end of the movable plate is supported by a spring member.

7. The holder as set forth in claim 6 wherein said spring member is a compression spring.

8. A holder with an integral gripper for transporting a flexible pouch during manufacturing, said holder comprising:
    a base plate that is generally planar;
    a pair of opposed support members spaced a predetermined distance apart and directly attached to the base plate and angularly pivotal inward and outward relative to the base plate, wherein each support member includes an upper leg member having a guide channel formed in an inner surface of the upper leg member for gripping the pouch, and a lower leg member;
    a moveable plate that is parallel to and spaced apart from the base plate by a spring member, wherein the moveable plate supports an outer end of the lower leg of the support member, so that walls of the flexible pouch are held in tension when the flexible pouch is supported within the guide channel, and the walls of the flexible pouch are separated when the support members are pivoted inwardly.

9. The holder as set forth in claim 8 wherein the outer end of the lower leg is supported by the movable plate.

10. The holder as set forth in claim 8 wherein each end of the movable plate is supported by a spring member.

11. The holder as set forth in claim 8 wherein the spring member is a compression spring.

12. A holder with an integral gripper for transporting a flexible pouch during manufacturing and shaping the pouch during filling, said holder comprising:
    a base plate;
    a pair of opposed support members directly attached to the base plate and annularly pivotal inward and outward relative to the base plate, the support members projecting upwardly from the base plate and spaced a predetermined distance apart, wherein each support member has a predetermined shape;
    a guide channel formed in an inner surface of the support member for gripping the flexible pouch, wherein opening the flexible pouch and filling the flexible pouch with a product increases a pressure within the flexible pouch, to push the walls of the pouch outwards around an inner surface of the support member, to form the predetermined shape of the pouch.

13. The pouch holder of claim 12 wherein the inner surface of the support member is arcuate in shape to form the flexible pouch that is cylindrical in shape.

14. The pouch holder of claim 12 wherein each support member has a predetermined shape and are positioned a predetermined distance apart, to form the shape of the pouch.

* * * * *